United States Patent [19]

Ellett

[11] Patent Number: 4,961,560
[45] Date of Patent: Oct. 9, 1990

[54] TWO WAY LATCHING TRIP VALVE
[75] Inventor: James R. Ellett, Edmonton, Canada
[73] Assignee: Bralorne Resources Limited, Alberta, Canada
[21] Appl. No.: 169,740
[22] Filed: Mar. 18, 1988
[51] Int. Cl.5 ............................................ F16K 31/122
[52] U.S. Cl. .................... 251/63.5; 137/458; 251/63; 251/359
[58] Field of Search ............... 137/458; 251/63, 63.5, 251/359

[56] References Cited

U.S. PATENT DOCUMENTS

| | | | |
|---|---|---|---|
| 3,016,917 | 1/1962 | Hunt | 137/625.27 |
| 3,083,726 | 4/1963 | Woelfel | 137/458 |
| 3,646,969 | 3/1972 | Stampeli | 251/77 X |
| 4,026,326 | 5/1977 | Wells et al. | 137/458 X |
| 4,071,046 | 1/1978 | Cates | 91/465 X |
| 4,175,587 | 11/1979 | Chadwick et al. | 137/625.27 X |

Primary Examiner—Gerald A. Michalsky
Attorney, Agent, or Firm—John R. Uren

[57] ABSTRACT

A latching trip valve for opening and closing a safety device. The trip valve is operable manually and from the pressure of a pilot circuit which monitors the operating conditions of a pipeline. A floating seat is movable under the influence of a longitudinal movable poppet and its included seal means. The floating seat and seal means forms a closed passage until the pressure of the pilot circuit decreases whereas the passage is opened.

4 Claims, 2 Drawing Sheets

TWO WAY LATCHING TRIP VALVE

INTRODUCTION

This invention relates to a latching trip valve and, more particularly, to a latching trip valve in which the sealing relationships occur without sliding between the contacting members.

BACKGROUND OF THE INVENTION

Trip valves which are latched manually and armed by the operation of hydraulic pressure and which thereby monitor the operation of a pipeline are known. Such trip valves, when tripped by the action of a change in pressure in a pilot circuit, are operable to allow the exit of relatively large amounts of hydraulic monitoring fluid which may be necessary to shut down a valve in a pipeline used to terminate flow in the pipeline.

Such valves, however, are often of the "spool" variety. That is, the sealing relationships in known latching trip valves are caused by metal to metal "rubbing" contact. While metal to metal contact can create and maintain suitable seals, leakage is still frequently a problem under various conditions. In addition, such metals are necessarily hard in order to reduce friction between the metal surfaces and in order that impurities in the hydraulic oil within the trip valve will not score or damage the metal surfaces. Such metals are expensive and, although being hard, still remain subject to scoring and unsatisfactory operation with the passage of time.

SUMMARY OF THE INVENTION

According to the invention, there is disclosed a latching trip valve comprising a spindle longitudinally movable within a housing, a pilot piston connected to said spindle, a flexible seal between said piston and said spindle, a spring loaded floating seat movable relative to said housing, a passageway between said spindle and said floating seat said passageway being opened and closed by movement of said pilot piston relative to said floating seat.

BRIEF DESCRIPTION OF THE SEVERAL VIEWS OF THE DRAWINGS

A specific embodiment of the invention will now be described, by way of example only, with the use of drawings in which.

DESCRIPTION OF SPECIFIC EMBODIMENT

Figure 1:
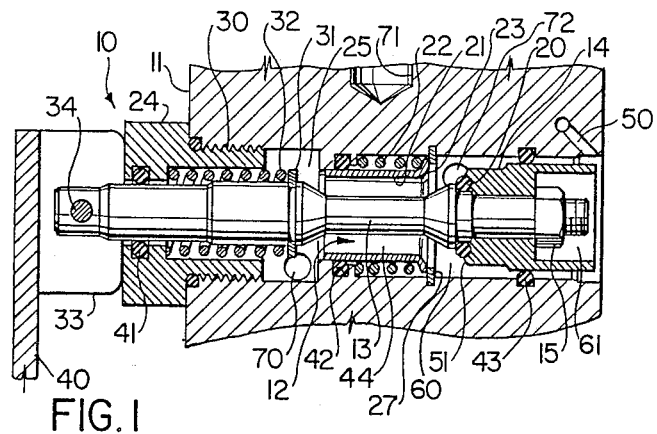
FIG. 1 is a diagrammatic partial sectional view of the latching trip valve in the TRIPPED condition according to the invention.
Figure 4:
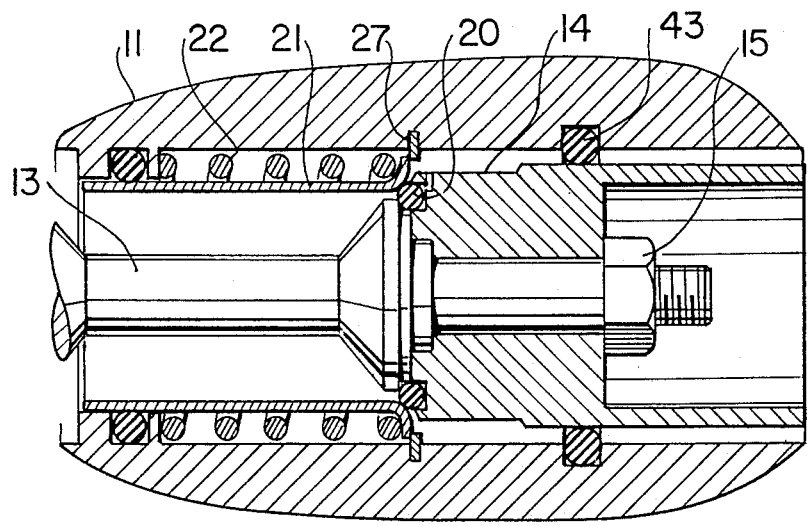
FIG. 4 is an enlarged diagrammatic view of the O-ring at the time of contact with the floating seat.
Figure 5:
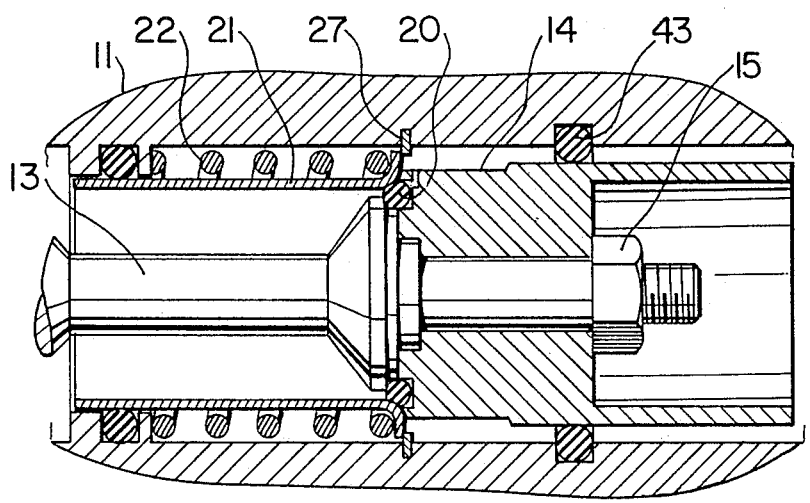
FIG. 5 is a view similar to FIG. 4 but illustrating the contact between the pilot piston and the floating seat.

Referring now to the drawings, a latching trip valve is illustrated generally at 10 in FIG. 1 and is mounted in a housing 11. The latching trip valve 10 comprises a poppet generally illustrated at 12, the poppet 12 including a spindle 13 longitudinally movable within the housing 11, a pilot piston 14 mounted about one end of the spindle 13 and a flexible seal in the form of an O-ring 20 mounted between the pilot piston 14 and the spindle 13. Spindle 13 is threaded at its rightwardly located end and a self-locking nut 15 is mounted on the spindle 13 and acts to retain the pilot piston 14 at the proper position on spindle 13 and in contact with the O-ring 20 as best illustrated in FIGS. 4 and 5.

A spring loaded floating seat 21 is mounted in the housing 11. A compression spring 22 is mounted between a lip 23 on one end of the seat and the housing 11 and acts to exert a rightwardly directed force on the seat 21 as seen in FIG. 1. The seat 21 is movable relative to the housing 11.

A latching plug 24 is threaded and mates with a female thread 30 on the inside of the housing 11 and the left hand side of FIG. 1. A snap ring 31 is mounted on the spindle 13 and a compression spring 32 is mounted between the latching plug 24 and the snap ring 31 so as to provide a rightwardly directed bias to the spindle 13.

A snap ring 27 is mounted in housing 11. It acts to retain the floating seat 21 from moving beyond the rightwardly position illustrated in FIG. 1.

A toggle 33 is rotatably mounted to spindle 13 about axis 34 and a lever 40 extends from the toggle 33. The lever 40 and toggle 33 are movable 90 degrees in the directions indicated about axis 34.

Three seals 41, 42, 43, respectively, are provided. Seal 41 is mounted in the latching plug 24 and acts between the latching plug 24 and the spindle 13. Seal 42 is mounted in the housing 11 and acts between the housing 11 and the floating seat 21. Seal 43 is also mounted in housing 11 and acts between the housing 11 and the pilot piston 14.

Three cavities 25, 60 and 61 are defined by the housing 11 and the latching trip valve 10. The first cavity 25 is entered by line port 70. Second cavity 60 is exited by tank port 72 and third cavity 61 is accessed by pilot port 50.

A passageway 44 extends between the floating seat 21 and the spindle 13. Hydraulic fluid is adapted to move through the passageway 44 and between cavities 25, 60 from line port 75 to tank port 72 as will be explained in greater detail hereafter.

Pilot port 50 is located in the housing 11 and opens at the inside circumference of the end of the recess of housing 11 in which the latching trip valve 10 is positioned. It opens outside the pilot piston 14 and acts to allow fluid to enter or to leave the area of the recess defined by the seal 43, the pilot piston 14 and the nut 15 again as will be described hereafter.

OPERATION

In operation, it will be assumed it is desired to prevent fluid from travelling through the passageway 44 from cavity 25 to cavity 60. This will be the case, for example, if it desired to set a safety valve (not shown) used for pipeline protection to an open position, in which position the safety valve will allow normal operation of the pipeline.

Figure 2:
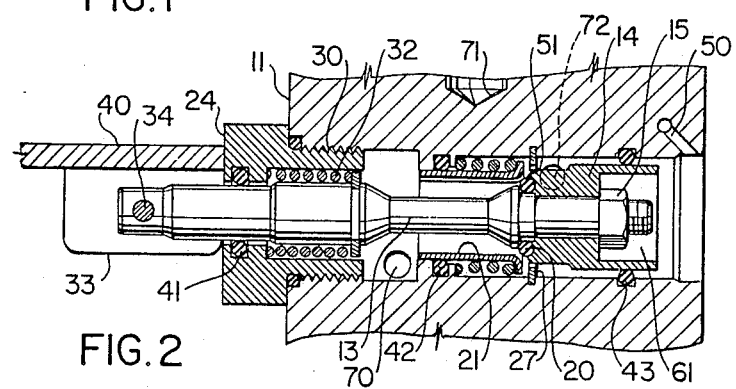
FIG. 2 is a view of the latching trip valve of FIG. 1 but illustrating the valve in its LATCHED position.

In order to prevent the fluid from travelling through passageway 44, the operator will rotate the lever 40 on toggle 33 ninety degrees about axis 34. As the lever 40 is rotated, the spindle 13 will move to the left as viewed in the figures. Floating seat 21 will remain stationary until it is contacted by the O-ring 20 at which point a seal will be formed between the floating seat 21, O-ring 20 and spindle 13, thereby closing the passageway 44. In addition, the O-ring 43 will be in contact with the skirt 51 of pilot piston 14 thus creating a seal between the pilot piston 14 and the nut 15. The latching trip valve 10 will assume the position illustrated in FIG. 2 and this position is the LATCHED position.

The operator will then operate the actuator pump 71 in order to open the safety valve on the pipeline. The port 70 is connected to a line extending between the actuator pump and the safety valve. Cavity 25 is isolated from cavity 60 because of the seal between the O-ring 20 and the floating seat 21 so no oil will travel through the passageway 44 back to tank. The safety valve will therefore open in order to allow normal pipeline operation.

Figure 3:
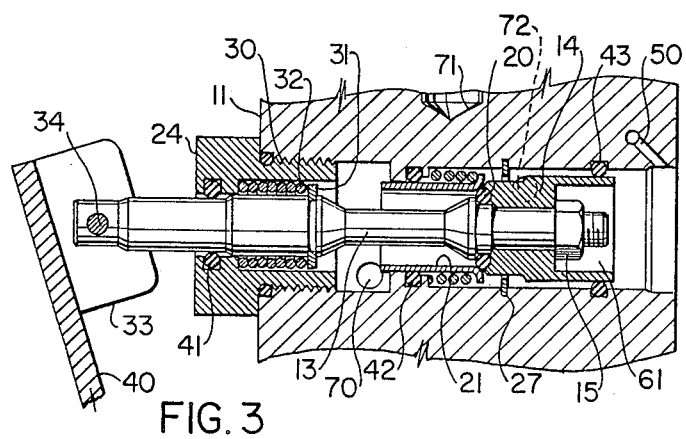
FIG. 3 is a view of the latching trip valve of FIG. 1 but illustrating the valve in its ARMED position.

The pilot circuit (not illustrated) which is connected to a suitable pressure sensor (not shown) connected to the pipeline will allow fluid to enter cavity 61 through port 72 when the pressure conditions in the pipeline are within the predetermined range and the safety valve is fully open. This fluid will force the poppet 12 further to the left under the influence of the pressure in cavity 61 and against the influence of the compression spring 32. The floating seat 21 will also move to the left under the influence of the contact with pilot piston 14 and O-ring 20 and against the compression spring 22 between the floating seat 21 and the housing 11. The toggle 33, being spring loaded, will move counterclockwise as the poppet 12 moves further to the left until it eventually reaches the position illustrated in FIG. 3. In this position, the latching trip valve 10 is in the ARMED position. So long as the pressure conditions in the pipeline are normal as sensed by the pilot circuit, the latching trip valve 10 will remain in the ARMED position with the safety valve being in the fully open position allowing normal and usual pipeline operation.

It will be noted that after contact is made between the O-ring 20 and the lip 23 of the floating seat 21, further movement of the poppet 12 will cause the pilot piston 21 to contact lip 23 of floating seat 21 thus forming a metal-to-metal between the pilot piston 21 and the floating seat 21 to further move the floating seat 21. This is desirable to prevent over-compression and possible inoperability of the O-ring 20.

It will next be assumed that a failure occurs somewhere in the pipeline such that the pipeline pressure drops below or exceeds the normal operating limits. In this event, the pilot circuit will immediately sense the pressure change and the pressure in the pilot circuit will drop with the result that fluid will exit from cavity 61 through port 50.

Without the leftwardly directed force in recess 52 caused by the hydraulic fluid, the spindle 13 will immediately move to the right under the influence of compression spring 32 on snap ring 31. The pilot piston 14 and O-ring 20 will move apart from the floating seat 21 when the lip 23 of the floating seat 21 reaches the washer 27. This will open the passageway 44 to fluid flow and the fluid will rush through the passageway from inlet port 70 to tank port 72 thus allowing the pipeline safety value to close in order to shut the pipeline to normal flow for safety and possibly environmental reasons. In this position, the latching trip valve 10 will be in the position illustrated in FIG. 1. This position, as earlier described, is known as the TRIPPED position.

After the problem has been found, the operation of the latching trip valve 10 will be repeated as has been described.

It may be desirable, under some circumstances, to manually actuate the pilot circuit in order to close the safety valve. In this event, the operator will push the toggle 33 to the right as viewed in FIG. 1. This will increase the pressure in the pilot circuit and a relief valve (not illustrated) in the pilot circuit allows the fluid in the pilot circuit to dump. The effect of this dump is precisely the same as if the latching trip valve 10 moves to the right under the influence of the pilot circuit as has been described with the result that the safety valve on the pipeline will immediately close.

While a specific embodiment of the invention has been described, many changes will readily occur to those skilled in the art and such description should be taken as illustrative only and not as limiting the scope of the invention as defined in accordance with the accompanying claims.

I claim:

1. A latching trip valve comprising a spindle longitudinally movable within a housing, a lever rotatably connected to said spindle and operable to move said spindle longitudinally relative to said housing upon rotation of said lever, a pilot piston connected to said spindle, an O-ring between said piston and said spindle, a spring loaded floating seat movable relative to said housing by said O-ring and said pilot piston, a passageway between said spindle and said floating seat, said passageway being opened and closed by movement of said pilot piston relative to said floating seat.

2. A latching trip valve as in claim 1 and further comprising a seal means between said pilot piston and said housing.

3. A latching trip valve as in claim 2 and further comprising a port located on the opposite side of said seal means from said floating seat.

4. A latching trip valve as in claim 3 and further comprising a plug mounted in said housing, said spindle being spring mounted within said plug and movable relative thereto.

* * * * *